(No Model.) 2 Sheets—Sheet 1.

H. N. PARKER.
VEHICLE WHEEL.

No. 519,388. Patented May 8, 1894.

Witnesses
Allie C. Whiting
H. W. Fowler

Inventor
Homer N. Parker
By his Attorney
Rufus B. Fowler (No Model.) 2 Sheets—Sheet 2.

H. N. PARKER.
VEHICLE WHEEL.

No. 519,388. Patented May 8, 1894.

Witnesses
Allie C. Whiting
H. W. Fowler.

Inventor
Homer N. Parker.
By his Attorney
Rufus B. Fowler.

THE NATIONAL LITHOGRAPHING COMPANY,
WASHINGTON, D. C.

UNITED STATES PATENT OFFICE.

HOMER N. PARKER, OF WINCHENDON, MASSACHUSETTS, ASSIGNOR OF ONE-HALF TO ORLANDO MASON, OF SAME PLACE.

VEHICLE-WHEEL.

SPECIFICATION forming part of Letters Patent No. 519,388, dated May 8, 1894.

Application filed July 19, 1892. Serial No. 440,565. (No model.)

*To all whom it may concern:*

Be it known that I, HOMER N. PARKER, a citizen of the United States, residing at Winchendon, in the county of Worcester and State of Massachusetts, have invented a new and useful Improvement in Wheels for Vehicles, of which the following is a specification, reference being had to the accompanying drawings, forming a part of the same, and in which—

Figure 1:
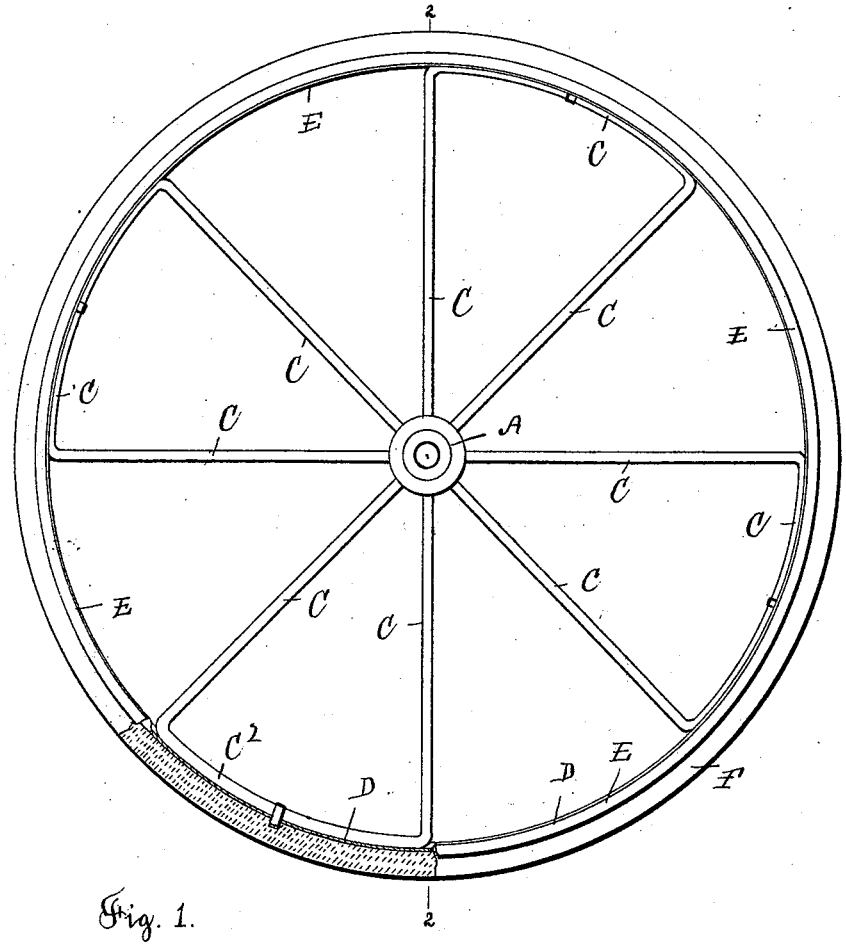
Figure 2:
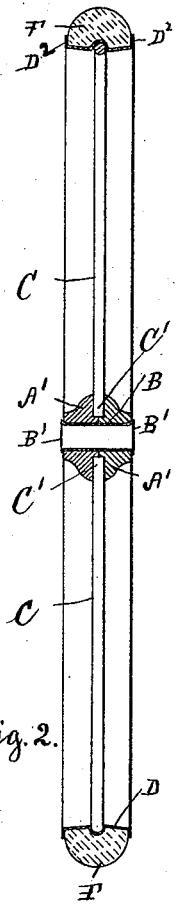
Figure 4:
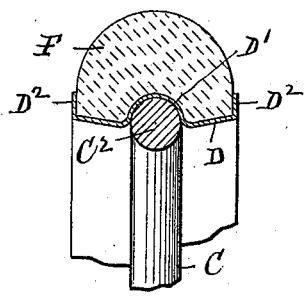
Figure 3:
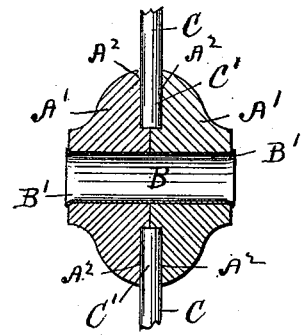
Figure 5:
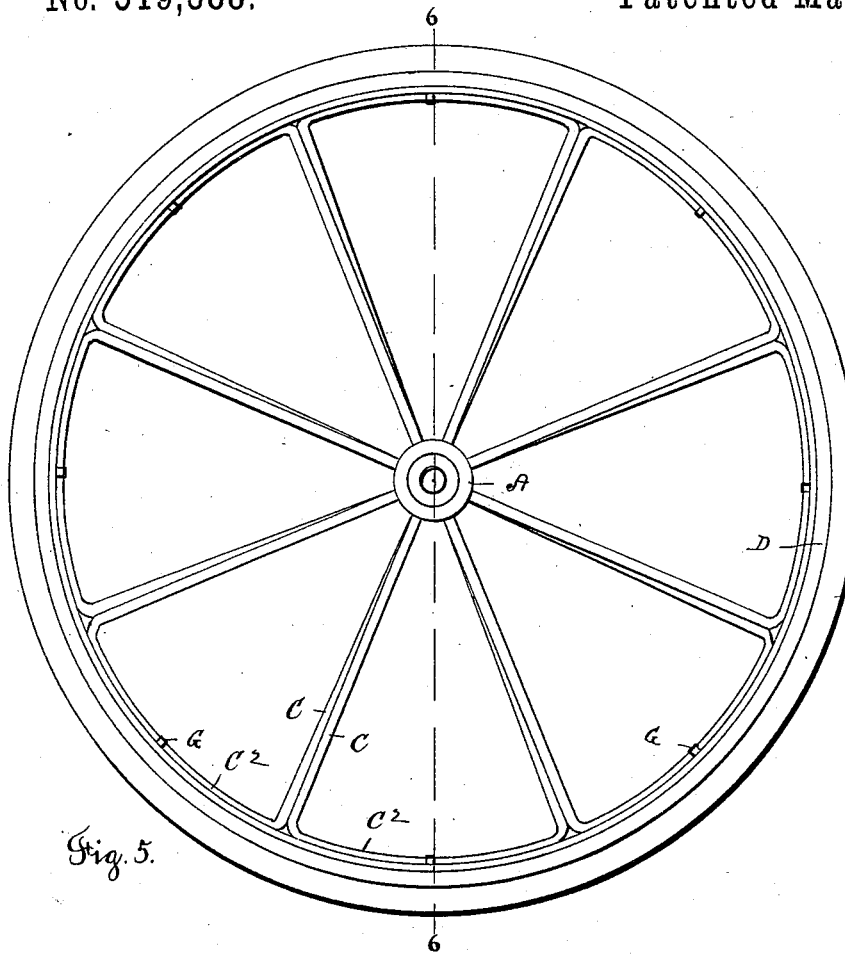
Figure 6:
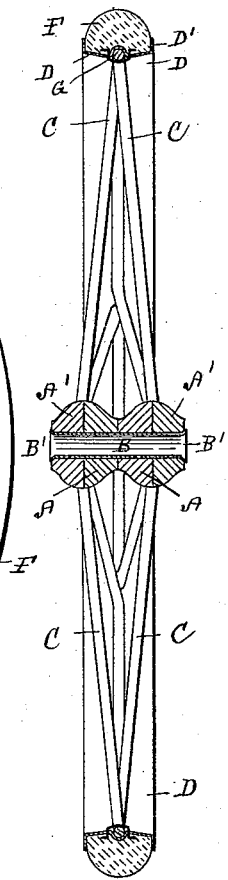
Figure 7:
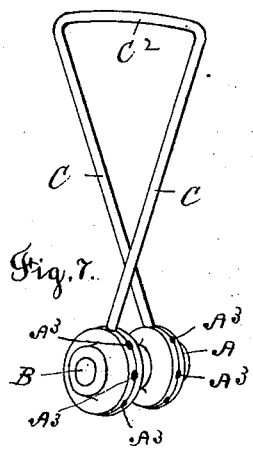
Figure 8:
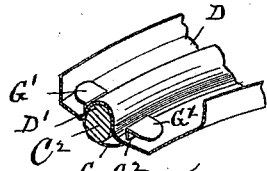
Figure 10:
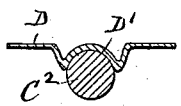
Figure 9:
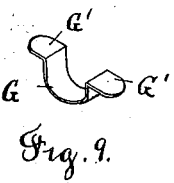
Figure 11:
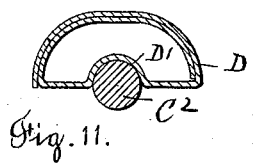

Figure 1 represents a side view of a wheel embodying certain features of my invention. Fig. 2 is a central sectional view on line 2 2, Fig. 1. Fig. 3 is a sectional view of the hub as shown in Fig. 2, but upon a larger scale. Fig. 4 is a sectional view of the rim and tire as shown in Fig. 2, but upon a larger scale. Fig. 5 is a side of a wheel showing additional features, also embodying my invention. Fig. 6 is a vertical sectional view on line 6, 6, Fig. 5. Fig. 7 is a detached view of the double hub as shown in sectional view in Fig. 6, together with one of the bent wires forming the spokes. Fig. 8 represents a portion of the tire. Fig. 9 represents a detached view of one of the staples by which the rim and spokes are attached, and Figs. 10 and 11 show two modified forms of the rim of the wheel shown in sectional view.

Similar letters refer to similar parts in the different figures.

My invention relates to certain improvements in the construction of metallic wheels for vehicles and other purposes and it consists in certain novel features of construction, as hereinafter described, and set forth in the annexed claims.

Referring to the accompanying drawings, A denotes the hub of the wheel, formed of the two metallic disks $A'$, $A'$ and having semicircular recesses $A^2$ cast in them, which, when the disks are united, form a circular chamber $A^3$ to receive the ends of the spokes. These metallic disks are provided with a central hole to receive a tube B, which is inserted, and the disks are united together by expanding the ends $B'$ of the tube. The spokes C are formed of a metallic rod or wire having its ends $C'$ entering the chambers formed by the recesses $A^2$. The central section of each metallic rod, or wire, is curved at $C^2$ concentrically with the rim of the wheel. The rim D consists of a metallic band or hoop having a concave recess $D'$ upon its inner side to receive the curved section $C^2$ of a metallic rod forming the spokes. Each of the rods when bent forms two spokes with the central section of the rod resting against the inner side of the rim. In the construction of the wheel the spokes are placed in position and their inner ends clamped between the disks $A'$, $A'$ and the disks are then securely joined together by the insertion of the short tube B and the expansion of the ends of the tube as already described.

In Figs. 5, 6 and 7 I have represented a construction of wheel, in which a double set of spokes are employed by means of which I secure a continuous support beneath the rim of the wheel and I also attach the opposite ends of each of the bent rods forming the spokes to the hub in different vertical planes by which the wheel is made to resist lateral strains and rendered much stronger and stiffer. The hub of the wheel as shown in Figs. 5, 6 and 7 is made double and is formed of four disks $A'$, instead of two, and they are all securely joined together by means of the central tube B, in the same manner as already described with reference to the single hub. Each half of the double hub is provided with a series of radial chambers $A^3$ to receive the ends of the spokes formed by the recesses in the disks $A'$ and in the construction of the wheel one end of each of the bent rods forming the spokes, is inserted in one of the corresponding chambers $A^3$ and the opposite end of the rod is inserted in a corresponding chamber in the opposite half of the hub as represented in Figs. 6 and 7. This causes the spokes to stand slightly bracing and also enables me to employ double the number of spokes and to support the entire rim upon the curved sections $C^2$, while in the construction shown in Fig. 1 only one-half the rim is thus supported. The other half of the rim, in the alternate sections E, E, not being thus supported renders the rim more liable to be bent.

The rim as represented in Fig. 4 can have its edges $D^2$ turned outward to receive a rubber tire F if desired, or the metallic tire may be formed in the shapes represented in Figs. 10 and 11, or in other desirable shapes, which will readily be suggested.

Figs. 8 and 9 illustrate one convenient method by which the curved sections of the bent rods forming the spokes may be attached to the rim and which consists in inclosing the rod by a staple G the ends G' of which are passed through slits G² and are bent over on the outside of the rim as represented in Fig. 8.

In Figs. 10 and 11 I have shown modified forms of the rim by which the wheel is adapted to be used without a tire; the rim itself forming the "tread;" but the particular form of the rim forms no part of my present invention and many other forms will readily suggest themselves in addition to those which I have shown.

What I claim as my invention, and desire to secure by Letters Patent, is—

1. The combination in the hub of a wheel, of a pair of disks having a central hole and a tube extending through the central hole of said disks with its ends expanded, in order to unite the disks together, said tube forming the bearing of the wheel, substantially as described.

2. The combination with the hub and rim of a wheel, said rim having a channel or groove in its inner surface, of a series of spokes formed in pairs, each pair of spokes consisting of a rod, or wire, bent at its central section to correspond with said rim, said curved section resting in the channel, or groove in said rim, whereby the outer ends of said spokes are held from lateral movement, substantially as described.

3. The combination of a rim, a hub provided with two series of radial chambers in different planes to receive the inner ends of the spokes and a series of spokes formed of rods, or wires, bent at their central sections to correspond with the inner surface of said rim, each rod, or wire, forming a pair of spokes with their inner ends held in said hub, but in different planes, and having the curved sections of said rods, or wires, resting against the center of the inner surface of said rim, whereby said spokes are inclined from a vertical plane and the inner surface of said rim is supported, substantially as described.

Dated the 15th day of July, 1892.

HOMER N. PARKER.

Witnesses:
GEO. M. WHITNEY,
JOHN D. HOWARD.